United States Patent
Bucsa et al.

(10) Patent No.: US 10,031,721 B2
(45) Date of Patent: Jul. 24, 2018

(54) SYSTEM AND METHOD FOR PROCESSING CONTROL COMMANDS IN A VOICE INTERACTIVE SYSTEM

(71) Applicant: Tyco Safety Products Canada Ltd., Concord (CA)

(72) Inventors: Andrei Bucsa, Toronto (CA); Stephen D. W. Fosty, Brampton (CA); Gregory W. Hill, Newmarket (CA)

(73) Assignee: Tyco Safety Products Canada Ltd., Concord (CA)

( * ) Notice: Subject to any disclaimer, the term of this patent is extended or adjusted under 35 U.S.C. 154(b) by 0 days.

(21) Appl. No.: 14/713,513

(22) Filed: May 15, 2015

(65) Prior Publication Data

US 2015/0331666 A1  Nov. 19, 2015

Related U.S. Application Data

(60) Provisional application No. 61/993,686, filed on May 15, 2014.

(51) Int. Cl.

| | |
|---|---|
| *G10L 21/00* | (2013.01) |
| *G10L 25/00* | (2013.01) |
| *G06F 3/16* | (2006.01) |
| *G10L 15/22* | (2006.01) |
| *G01S 3/80* | (2006.01) |
| *H04R 1/32* | (2006.01) |

(Continued)

(52) U.S. Cl.
CPC .............. *G06F 3/167* (2013.01); *G01S 3/805* (2013.01); *G01S 3/8006* (2013.01); *G10L 15/22* (2013.01); *G10L 15/30* (2013.01); *H04R 1/326* (2013.01); *G10L 2015/223* (2013.01); *H04R 2201/403* (2013.01); *H04R 2430/20* (2013.01)

(58) Field of Classification Search
CPC .......... G10L 15/22; G10L 15/30; G06F 3/167
USPC ....................................... 704/275
See application file for complete search history.

(56) References Cited

U.S. PATENT DOCUMENTS 9,171,546 B1 * 10/2015 Pike ..................... G10L 15/265
2006/0242715 A1 * 10/2006 Mrazovich ....... G08B 13/19628
726/35

(Continued)

OTHER PUBLICATIONS

"PhotoFace Dashboard." Oddcast. <http://host-d.oddcast.com/php/application_UI/doorId=357/clientId=1/?mId=0.4>. 1 page.

*Primary Examiner* — Kevin Ky
(74) *Attorney, Agent, or Firm* — HoustonHogle LLP

(57) ABSTRACT

A system and method for processing user speech commands in a voice interactive system is disclosed. Users issue speech phrases on a local device in a premises network, and the local devices first determine if the speech phrases match any commands in a set of local control commands. The control commands, in examples, can activate and deactivate premises devices such as "smart" televisions and simpler lighting devices connected to home automation hubs. In the event of a command match, local actions associated with the commands are executed directly on the premises devices in response. When no match is found on the local device, the speech phrases are sent in messages to a remote server over a network cloud such as the Internet for further processing. This can save on bandwidth and cost as compared to current voice recognition systems.

13 Claims, 7 Drawing Sheets

(51) Int. Cl.
    *G01S 3/805*    (2006.01)
    *G10L 15/30*    (2013.01)

(56) References Cited

U.S. PATENT DOCUMENTS

| | | | | |
|---|---|---|---|---|
| 2008/0065387 | A1* | 3/2008 | Cross, Jr. | G10L 15/22 704/270 |
| 2008/0214253 | A1* | 9/2008 | Gillo | A63F 13/31 463/1 |
| 2009/0271002 | A1* | 10/2009 | Asofsky | G05B 15/02 700/3 |
| 2011/0184735 | A1* | 7/2011 | Flaks | G10L 17/00 704/240 |
| 2012/0155703 | A1* | 6/2012 | Hernandez-Abrego | H04R 3/005 382/103 |
| 2012/0182431 | A1* | 7/2012 | Asanov | G06F 19/3481 348/207.1 |
| 2013/0117377 | A1* | 5/2013 | Miller | H04L 67/38 709/205 |
| 2014/0006028 | A1* | 1/2014 | Hu | G10L 17/04 704/251 |
| 2015/0302867 | A1* | 10/2015 | Tomlin | G10L 25/48 704/270 |

* cited by examiner

SYSTEM AND METHOD FOR PROCESSING CONTROL COMMANDS IN A VOICE INTERACTIVE SYSTEM

RELATED APPLICATIONS

This application claims the benefit under 35 USC 119(e) of U.S. Provisional Application No. 61/993,686, filed on May 15, 2014, which is incorporated herein by reference in its entirety.

BACKGROUND OF THE INVENTION

Premises security systems are increasingly including automated control capabilities. Premises such as a home or business typically include premises devices. The premises devices are responsive to control commands and can control other devices. Examples of premises devices include door controllers that control door sensors, windows, security cameras, and automation hubs.

Users program the system to implement traditional security objectives, such as activating or deactivating the system at specific times or according to a schedule, sending control commands to the premises devices, and sending alert messages in response to security events. Users typically program the system via a keypad based local device within the premises network, or via applications running on computing devices such as mobile phones and laptops, in examples.

More advanced premises security systems can provide additional automation and control capabilities beyond that of traditional systems. Examples include controlling a home premises' lighting, heating systems, and entertainment systems. In addition, the advanced systems can also include sophisticated voice control capabilities and the ability to access remote services over the Internet. These systems are also known as voice responsive or voice interactive systems.

SUMMARY OF THE INVENTION

In general, according to one aspect, the invention features a method for processing control commands in a voice interactive system. The method comprises receiving speech phrases on a local device within a premises network, and comparing the speech phrases on the local device to a set of local control commands. The local device control premises devices executing local actions in response to the speech phrases matching the local control commands. Then, the speech phrases are sent in messages to a remote server in response to the speech phrases not matching the local control commands. Interactive applications run on the remote server for interpreting commands on the remote server matching the speech phrases in the messages.

In general, according to another aspect, the invention features a method for tracking a user in a voice interactive system. The method comprises receiving speech phrases from the user on a local device within a premises network, and detecting the speech phrases via a beam forming and steering system of the local device that determines a spatial location of the user from the speech phrases; and controlling an avatar on the local device in response to the spatial location of the user.

In embodiments, the speech phrases can be detected on two or more local devices via a voice activity detection system of the two or more local devices. Usually control streams are created and included with the messages sent to the remote server.

In examples, the local control commands activate and deactivate the premises devices such as security cameras, lights, televisions, motion detectors, door controllers, monitoring points, home automation hubs, and/or remote controlled power outlets.

Additionally, the interactive applications can be voice controlled interactive applications such as voice interactive emergency services, voice activated phone calling, voice controlled intercom, voice controlled email, voice controlled banking transactions, voice controlled audio news feeds, voice controlled internet search, audio targeted advertising, voice controlled automation, and/or audio voice reminders.

Preferably, the method further comprises detecting and tracking spatial locations of users making the speech phrases via an audio beam forming and steering system of the local device. The local device can also present an avatar on a user interface, which avatar moves in response to the spatial location of the users making the speech phrases determined by the audio beam forming and steering system of the local device.

In an implementation, the remote server receives tracked spatial locations of users making the speech phrases from the local device and interprets the speech phrases in response to the spatial locations. The remote server can also detect emotions of the users from the voice data, and in response to the detected emotions, send voice messages associated with the detected emotions to the local devices.

In further aspects, the remote server can receive voice data from users sent in audio streams from the local devices, analyze and create audio message information from the voice data, save the audio message information to a current context queue, and compare new audio message information to the saved audio message information in the current context queue to infer context of and improve speech recognition of the voice data.

In general, according to yet another aspect, the invention features a voice interactive system. The system includes a remote server, premises devices, and a local device. The remote server preferably provides interactive applications and remotely interpreted commands. The premises devices are included within a premises network. The local device is included within the premises network and receives speech phrases from users, sends control commands to the premises devices in response to the speech phrases matching local control commands, and sends the speech phrases in messages to the remote server in response to the speech phrases not matching the local control commands.

In general, according to still another aspect, the invention features a premises voice interactive system. The system includes a microphone array for detecting speech phrases from a user, an audio beam forming and steering system that determines a spatial location of the user from the speech phrases, and a display including an avatar that moves in response to the spatial location of the user.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 3A shows a keypad and 2-D microphone array, FIG. 3B shows a keypad and 1-D microphone array with a joystick, and FIG. 3C shows a graphics screen with interactive avatar and 1-D microphone array with a joystick;

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
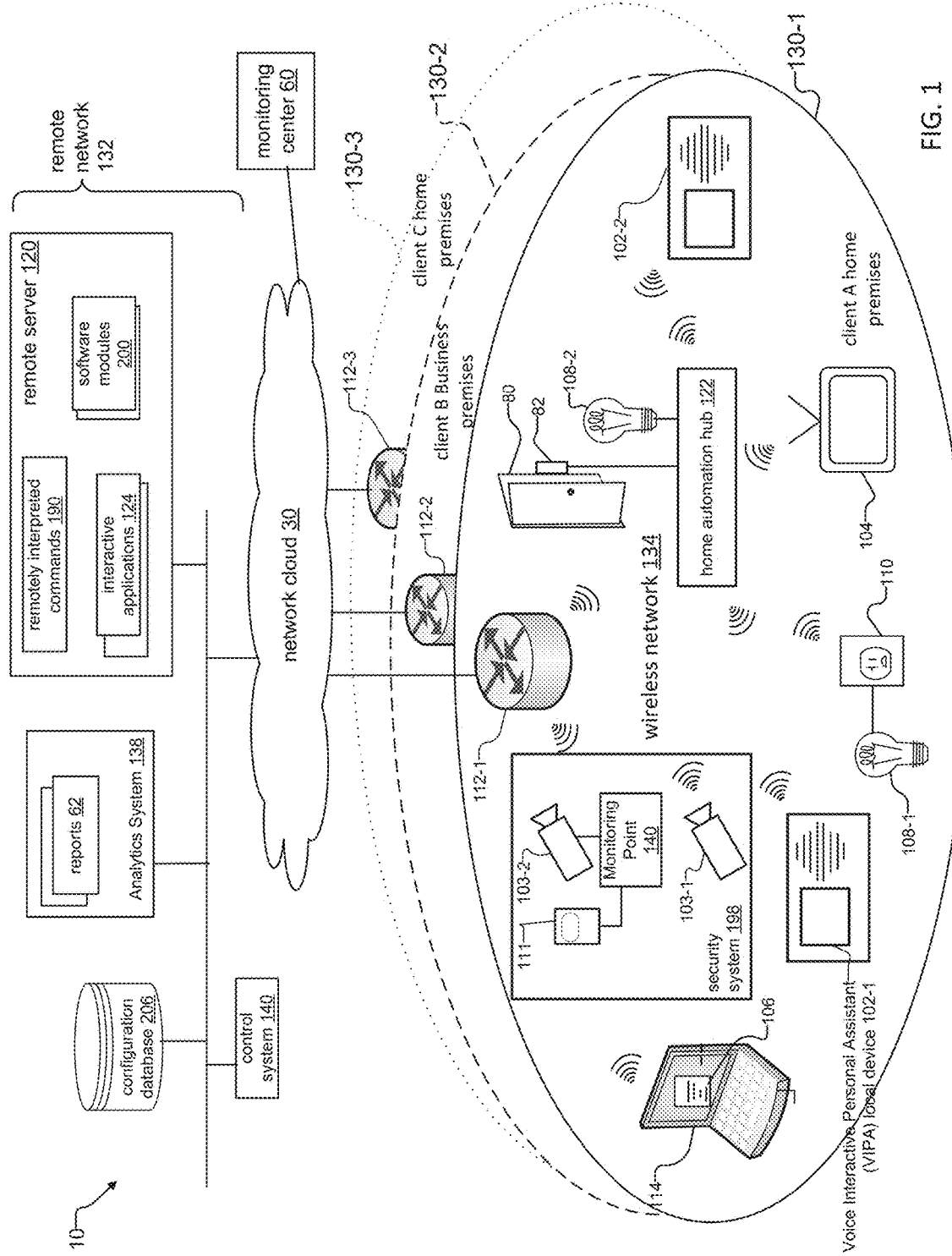
FIG. 1 is a system block diagram of a voice interactive system including one or more premises networks, where the premises networks include a Voice Interactive Personal Assistant (VIPA) local device for communicating with a remote server.

FIG. 1 shows a voice interactive system 10. The voice interactive system 10 includes three exemplary premises networks 130 that access a remote network 132 over a network cloud 30, such as the Internet. Of the networks 130, client A has network 130-1 within a home premises, client B has network 130-2 within a business premises, and client C has network 130-3 within a home premises. The premises networks 130-1 through 130-3 connect to network cloud 30 via access points 112-1 through 112-3, respectfully. In examples, the access points 112 are wireless access points and create a wireless network 134 within each of the premises networks 130. A monitoring center 60 is also connected to the network cloud 30. Example wireless networks 134 include WiFi/802.11, ZigBee, and Bluetooth.

The remote network 132 includes a configuration database 206, a control system 140, an analytics system 138, and and a remote server 120. The remote server 120 includes software modules 200, remotely interpreted commands 190, and interactive applications 124. The analytics system 138 includes reports 62. The reports 62 include information concerning usage of the interactive applications 124, which can be used to improve the system or for marketing proposes.

Details for client A's home premises network 130-1 are shown. Premises network 130-1 includes wireless access point 112-1, Voice Interactive Personal Assistant (VIPA) local devices 102-1 and 102-2, computing device 114 (e.g. a laptop), premises devices controlled by the local devices 102, and various sensors and lights 108 that are typically connected in a wired fashion to the premises devices. The laptop 114 includes a browser 106 from which users can configure the local devices 102. The browser 106 also provides a secure web portal to the remote server 120. This allows users to subscribe to services such as interactive applications 124 on the remote server 120.

In order to allow the flexibility and reduce component costs, required computing power is balanced between local devices and the cloud. This will ensure the scalability as well as the service flexibility.

In examples, the premises devices include a "smart" television 104 with a wireless interface, a home automation hub 122, a remote controlled switch or power outlet 110, wireless security camera 103-1, and monitoring point 140. The monitoring point 140 controls motion sensor 111 and wired security camera 103-2. The security cameras 103, motion sensor 111, and monitoring point 140 are included within a security system 198. Home automation hub 122 controls light 108-2 and door sensor of door 80. The remote controlled power outlet 110 controls light 108-1.

Figure 2:
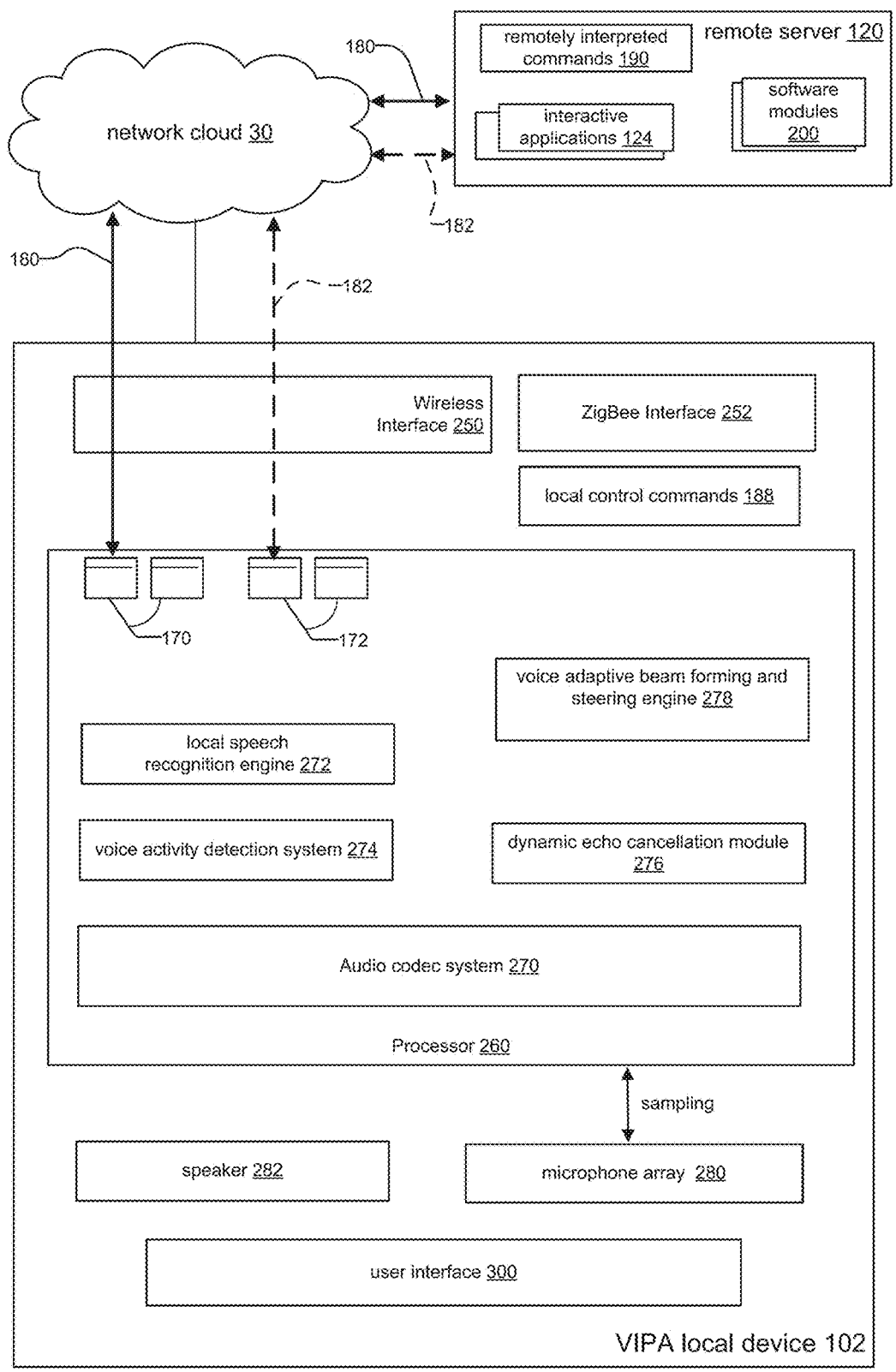
FIG. 2 is a block diagram of major components of the Voice Interactive Personal Assistant (VIPA) local device.

FIG. 2 shows a block diagram of an exemplary local device 102. The local devices 102 are typically low-cost devices that preferably respond to voice commands, either exclusively or non-exclusively. The local device 102 includes a wireless and/or wired interface 250, a ZigBee interface 252, local control commands 188, a processor 260, a speaker 282, a microphone array 280, and a user interface 300. The wireless interface is typically a Wi-Fi interface but can also use other wireless technologies such as Bluetooth, in one example.

The processor 260 includes a local speech recognition engine 272, a dynamic echo cancellation module 276, control and audio sockets 170/172, and an audio codec system 270. The processor 260 also includes a voice adaptive beam forming and steering engine 278, also referred to as an audio beam forming and steering system. The local device 102 creates control streams 180 via the control sockets 170 and audio streams 182 via the audio sockets 172. The control streams 180 and the audio streams 182 are either TCP or UDP based connections between the local device 102 and the remote server 120 via the wireless interface 250. The local device connects to the network cloud 30 through an available wireless connection 134 using WPS or web configuration in examples.

The local device 102 remains in a standby mode until it senses a triggering speech phase from a user. The local device 102 utilizes Voice Activity Detection (VAD) to discriminate between human and non-human audio sounds to eliminate potentially spurious triggering phrases.

Each local device 102 connects to the remote server via a TCP control stream 180. A basic local device 102 uses a minimum of two sockets: a control socket 170 for transfer of the control signals and an audio socket 172 for transfer of audio/voice data.

The ZigBee or other low power home automation wireless interface 252 enables voice control of ZigBee capable premises devices, such as the smart television 104, remote switch 100, and home automation hub 122. In examples, ZigBee interface 252 can control remote switch 110 for activating and deactivating light 108-1, the automation hub 122 for activating and deactivating light 108-2 and door sensor 82, and the smart television (TV) 104 for channel changes, volume control, and TV ON/OFF, to name a few examples.

When users speak into the local device 102, the speech phrases are interpreted as triggering phrases. In response, the local device 102 typically opens a TCP control socket 170 for a bidirectional control stream 180 and a UDP audio socket 172 for bidirectional voice data transmission and reception over an audio stream 182. The speech phrases are then converted to text and compared to the local control commands 188 to determine if the speech phrases match any of the local control commands 188. The local control commands 188 are associated with short speech phrase commands (e.g. Light On/OFF, TV ON/OFF).

Phrases matching any of the local control commands 188 preferably utilize a "local loop" communications path of the ZigBee or other local interface 252. In response to the matching local control commands, the local device 102 closes the UDP audio sockets, and instructs the ZigBee enabled premises device via the control stream 180 to execute a local action such as turning on/off the lights directly on the premises devices.

When the user speech phrases do not match any local control commands 188, the local device 102 includes the speech phrase in a message, and sends the message in the control stream 180 over the network cloud 30 to the remote server 120 for further processing. If a remotely interpreted command 190 matches the speech phrase in the message, the remote server 120 executes interactive applications 124 in response.

For example, a complex speech phrase such as "tune TV to local CBC News" might not be supported as a local control command 188, but matches a remotely interpreted command 190 on the remote server 120. In response, the remote server 120 executes a simple interactive application 124 that looks up the channel number of the local CBC News program in a program scheduling map. The remote server 120 then includes the channel number and associated channel change command in a message, and sends the message within the control stream 180 back to the local device 102. The local device 102 receives the message in the control stream 180, and instructs the ZigBee interface 252 to change the channel on the smart TV 104 to the channel number indicated in the message.

In another example, the ZigBee interface 252 interacts with life support premises devices such as medical ID fobs or bracelets. The wireless interface 250 can communicate with the remote server 120 by using as many as 8 simultaneous TCP or UDP socket 170/172 based connections. The network registration is performed by using WPS service or secure web configuration. The remote server 120 identification is done using an asymmetric authentication algorithm based on a hidden encryption key stored internally within the remote server 120.

The local devices 102 are preferably designed to fit in a small form factor and to use off the shelf components where possible to minimize cost. In a preferred implementation, the local device 102 is about half the size of a typical smartphone mobile device and is designed around a low cost processor 260 such as a Texas Instruments Digital Signal Processor TI DSP (C5535). Other exemplary components include a Wi-Fi interface (CC3100) for the wireless interface 250, a ZigBee SoC (CC2538NF11) for the ZigBee interface 252, and a low power MONO voice codec (TLV320AIC12K) as the audio codec system 270 with integrated 8 ohms speaker driver for speaker 282. In one implementation, the audio codec system is a G729/G711 codec which minimizes internet audio traffic in the audio streams 182 and supports Voice over IP (VoIP) applications.

The local speech recognition engine 272, in one implementation, supports TrulyHandsFree (THF) sensory voice control technology THF3.0 that can be triggered by a specific speech phrase. In the current implementation, the local speech recognition engine 272 can recognize at least 40 local control commands 188. Voice Activity Detection (VAD) is implemented on the voice activity detection system 274 of each local device 102 to minimize voice traffic and balance data traffic among multiple local device 102 installed at the same premises. The dynamic echo cancellation module 276 suppresses echoes that can occur during Voice over IP (VOIP) phone calls.

A user session between the local device 102 and remote server 120 is closed by using a keyword or by voice timeout (e.g. absence of detected speech for a configured timeout period). While multiple VIPA local devices 102 can be installed in a premises network 130, only one local device 102 is active at any time. The active device 102 is the one that first detected a triggering speech phrase. In the event of a tie, the active device will be decided by the level of sound and spatial position of the user determined from the audio beam forming and steering engine 278.

Figure 3A:
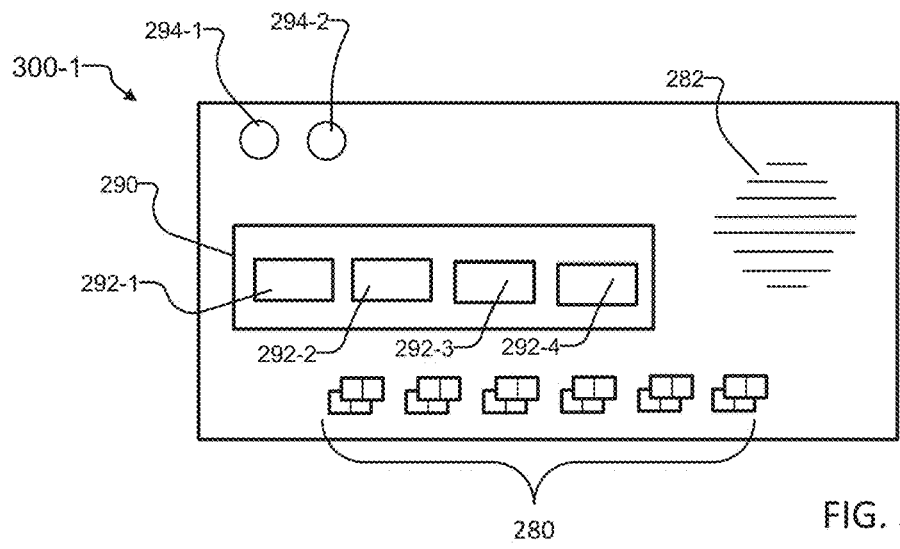
FIGS. 3A-3C are different embodiments of the user interface of the VIPA local client, where
Figure 3B:
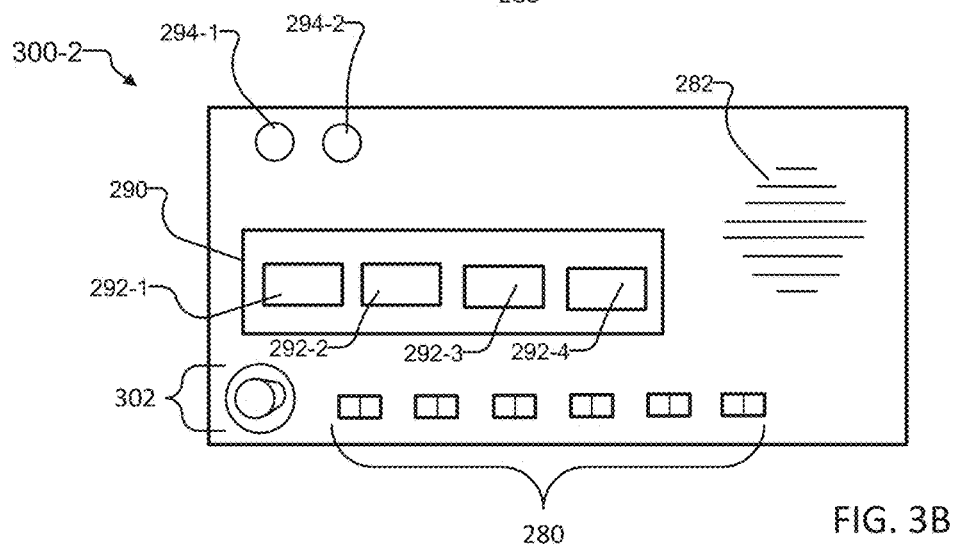
Figure 3C:
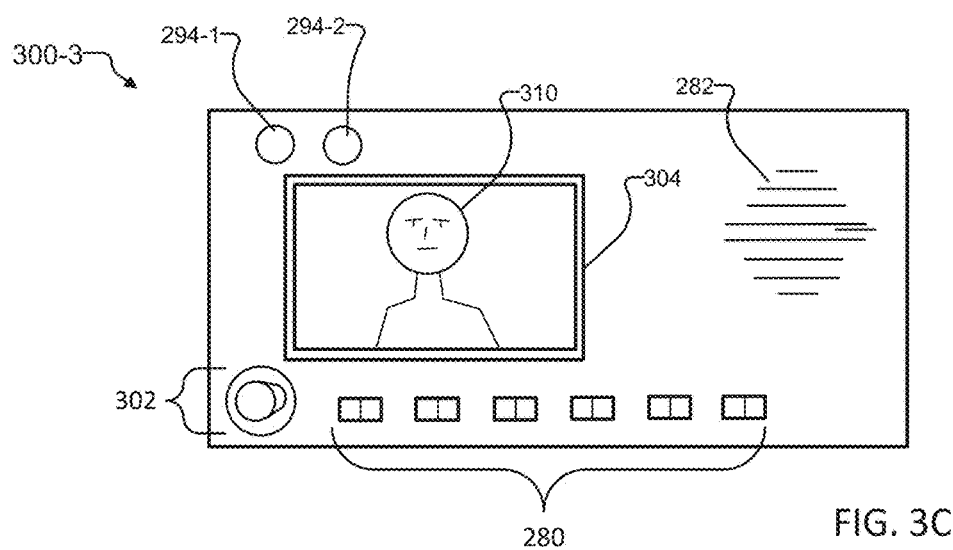

FIG. 3A through FIG. 3C show different embodiments of the user interface 300 of the local device 102. All three embodiments include Light Emitting Diodes (LEDs) 294, a speaker 282, and a microphone array 280.

FIG. 3A shows a first embodiment of user interface 300-1. LEDS 294-1 and 294-2 are RGB LEDs that indicate the status of the local device (e.g. RED—offline, GREEN—online, BLUE waiting for a voice prompt, PINK searching internet and ORANGE—speak). The microphone array 280 is a 2-D microphone array for beam forming proposes, which enables the tracking of the origin of a speaker in both azimuth and elevation. A keypad 290 includes four or more keys 292-1 through 292-4, in a preferred implementation.

FIG. 3B shows a second embodiment of user interface 300-2. The microphone array 280 is a linear microphone array for beam forming purposes that enables the tracking of the origin of a speaker in azimuth. The user interface 300-2 also includes a micro joystick 302 that augments the capabilities provided by the keypad 290.

FIG. 3C shows a third embodiment of user interface 300-3. As in FIG. 3B, the user interface 300-2 includes a micro joystick 302 that augments the capabilities provided by the keypad 290. In addition, the user interface 300-3 includes a graphics screen 304 that presents an interactive avatar 310 to the user. In one implementation, the joystick 302 can also be a virtual joystick achieved by a gesture recognition engine, such as using capacitive infrared or a security camera 103.

Returning to the description of FIG. 2, for the embodiment of FIG. 3C a processor 260 such as the Allwiner A20 ARM processor more suitable for Android based platforms is preferred. The microphone array 280 includes AGC for the microphone level auto adjustment and dynamic range compensation.

The audio beam forming and steering system 278 uses adaptive algorithms to detect and track spatial locations of users making the speech phrases speaker and to maximize the signal to noise ratio (SNR) when selecting the user's speech. In examples, the audio beam forming and steering engine 278 can distinguish between two different users issuing speech phrases at one or more local devices 102- and 102-2. Based on speech recognition and user tracking, the local device 102 can recognize and process a possible domestic assault or other type of threatening situation involving the users within the premises network.

Moreover, the audio beam forming and steering engine 278 can control the interactive avatar of the embodiment in FIG. 3C. In one example, the avatar moves in response to the spatial location of the users making the speech phrases determined by the audio beam forming and steering system 278. Via beam forming, the local device 102 is able to distinguish between speech of two or more users. This allows recognition of possible cases of aggression against home owners. The usage of beam forming allows decreasing the background noise by focusing the interaction on speech of a specific user.

Figure 4:
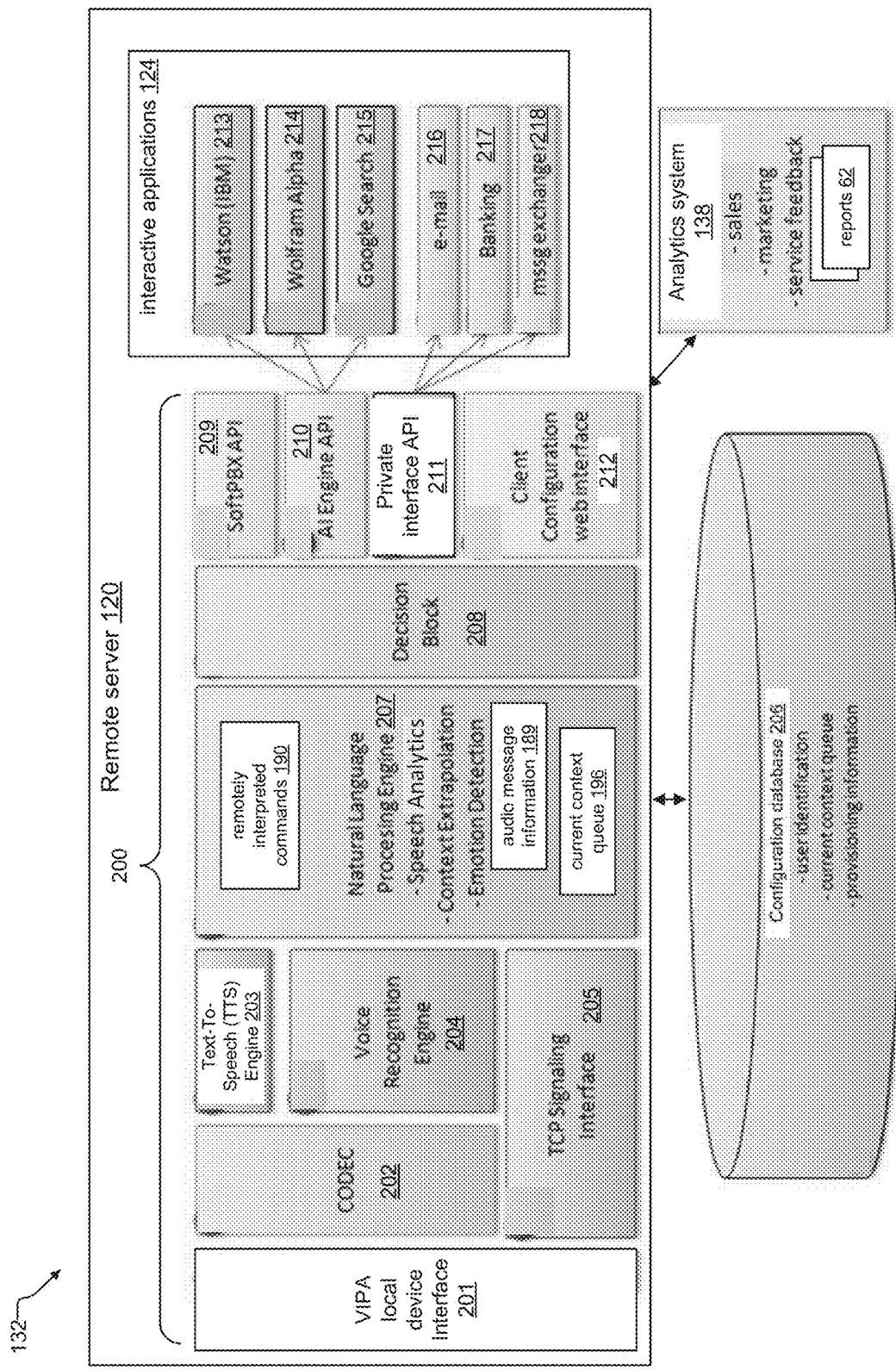
FIG. 4 is a block diagram of major components of a remote network, where the remote network includes a configuration database, an analytics system, and a remote server including interactive applications and software.

FIG. 4 shows more detail for the components of the remote network 132.

The remote network 132 includes remote server 120, configuration database 206, and analytics system 138. The remote server 120 includes software modules 200 and interactive applications 124. The analytics system 138 creates reports 62 for four sales marketing and service feedback purposes the configuration database 206 stores information such as user credentials, voice exemplars, current context of the users, spatial positions, and provisioning information, in examples. The context of users is inferred from spatial location data of the users determined by the audio beam forming and steering engine 278.

In a preferred implementation of the remote server 120, the voice interactive system 10 is scalable with respect to the number and type of services/interactive applications 124 it can provide and the software modules it uses. This is because in the preferred implementation, the software modules and the interactive applications are implemented as Software as a Service applications and/or utilize cloud technology as a main processing engine.

The interactive applications 124 listed in FIG. 4 are an exemplary and non-exhaustive list of services that the remote server 120 can provide to clients local devices 120 in the premises networks 130. The interactive applications 124 include cognitive learning systems such as IBM Watson 213, Wolfram Alpha 214, Internet search 215, email 216, bank transactions 217, and message exchanger 218, in examples. The interactive applications 124 are hosted on the remote server 120 as Software as a Service (SaaS) applications, in one implementation.

The software modules 200 include a VIPA (local device) interface 201, codec 202, a text to speech (TTS) engine 203, a voice recognition engine 204, a TCP signaling interface 205, a natural language processing engine (NLP) 207, and a decision block 208. Additional software modules include a SoftPBX API 209, an artificial intelligence (AI) API 210, a private interface API 211, and a client configuration web interface 212.

Of the software modules 200, one of the most important is the TTS Engine 203 which sends voice reply messages in response to user audio. The reply messages include emotion based on a mood detected in the user's voice. The voice recognition engine 204 converts user speech phrases to text, which are then processed by the NLP 207.

The NLP 207 also includes the list of remotely interpreted commands 190 and a current context queue 196. Operators of the service network 132 can update the software modules 200, the interactive applications 124 and their capabilities via the client configuration web interface 212.

The NLP Engine 207, the TTS Engine 203 and the Voice Recognition Engine 204 implement the core voice processing capabilities on the remote server 120. Interactions between the NLP Engine 207, the TTS Engine 203 and the Voice Recognition Engine 204 and the interaction between those 3 blocks can be at signaling or voice streaming level, in examples.

Other interactive applications 124/services include voice interactive emergency services, voice activated phone calling, voice controlled intercom, voice control for automation, voice controlled email, voice controlled banking transactions, voice controlled audio news feeds, voice controlled internet search, voice controlled ordering and reading of electronic books (eBooks), audio targeted advertising, and/or audio voice reminders.

For voice interactive emergency services, the local device 102 can also send also critical life support information when available. It is necessary to say the password than call emergency and a VoIP call will be generated.

For voice controlled phone applications 124, the caller list can be synchronized and updated with a phone contact list on a typical computing device or mobile phone. The voice controlled intercom can be used as audio station or as voice controlled intercom communicator between two locations. The intercom function allows audio conferencing. The voice controlled email application 216 can read and write messages using voice interaction. Users can access multiple mailboxes. The voice controlled ordering and reading of electronic books (eBooks) service is mostly for disabled persons.

The Voice Controlled Automation service can Turn ON/OFF lights, Change a TV channel, search for a show or rent a movie, in examples. The audio voice reminders can record a voice memo using voice interaction, where the messages can be resumed from any location or can be saved as e-mail attachment. The banking application can check banking information (latest transaction, stop or acknowledge a payment) and is accessed using an audio password. The voice controlled audio news feed application allows users to hear the latest news based on topic or an interest list.

Two additional aspects of the NLP 207 that provide the voice interactive system 10 with more of a "human touch" are speech analytics and user context extrapolation. The speech analytics feature of the NLP 207 translates the speech phrases and voice data of users into concrete and coherent audio message information 189 and analyzes the audio message information 189. Audio message information 189 includes the speech to text output from the voice recognition engine 204, detected emotion of the user inferred from the voice data, information created from the voice data of the users sent in audio streams 182 from the local devices 102, such as a textual representation of the voice data, and information about the speech phrases and the voice data created by the speech analytics and user context extrapolation features of the NLP 207, in examples.

The speech analytics feature of the NLP 207 can spot key words or phrases in the audio message information 189 such as names of businesses or products, determine topics under discussion, and detect repeated words to infer emphasis or emotion, in examples. The user context extrapolation feature saves a history of user interactions with the software modules 200 and/or interactive applications 124 to provide context for future user interactions.

The user context extrapolation feature provides the user interaction context by saving the audio message information 189 to a current context queue 196. The saved audio message information 189 in the current context queue 196 is time-stamped and is also saved to the configuration database 206. Then, new audio message information 189 is compared to the previous audio message information 189 in the current context queue 196 to infer patterns and trends.

In a preferred implementation, the current context queue 196 is a First In First Out (FIFO) buffer or stack of past user interactions (e.g. audio message information 189). The audio message information 189 are weighted in importance by how recent the audio message information 189 are. Because the current context queue 196 can include only so many audio message information 189, the oldest audio message information 189 are dropped from the queue 196 when the queue 196 becomes full. In one sense, this behavior mirrors that of typical human memory, where more recent audio message information 189 have more of an impact or "primacy effect" words and phrases have more of an impact.

The context provided by comparing new audio message information 189 to previous audio message information 189 in the context queue 196 can also be combined with information obtained from the speech analytics of the audio message information 189 and user preferences to improve the speech recognition capability of the NLP 207. In one example, the words "bank" and "tank" sound very similar. However, if the user's last audio message 189 was recorded for a banking interactive application, the NLP 207 is more likely to infer or detect the word "bank" during analysis of new audio message information 189. In another example, when a user asks to tune the TV 104 to a specific channel, the selection of the channel by one of the interactive applications 124 is made easier if the channel is compared to previous audio message information 189 that include channel changes and is weighted based on user preferences. In yet another example, if a user searches to buy a car and specifies a particular dealer or sales service, the system will warn the user when the car becomes available only if the user did not close the deal or if the user did not change their mind.

The decision block 208 submits the text message created by the NLP 207 in response to the user speech phrases to one or more other software modules 200 for further processing. These modules 200 include the SoftPBX 209 module in case of a phone call or a security monitoring request (voice verification or intercom), the AI Engine 210 in case of a general query to an voice enabled internet search or to Private Interface 211 in case of private request such as accessing a bank account via the banking interactive application 217, in examples.

The Client Configuration Web Interface 212 allows users to configure the voice interactive system 10. The provisioning information for each user is stored to the configuration database 206 and can be replicated for other users.

Typically, the software modules 200 are off the shelf commercial software products from leading vendors. In examples, the TTS engine 203 can be from Nuance or Ivona, the NLP from Nuance, IBM, Vestec, or Acapela, the AI Engine API 210 from Google, Yahoo, and Wolfram Alpha, in examples. This enables upgrades and/or changes to the software modules 200 to be transparent to users.

Figure 5A:
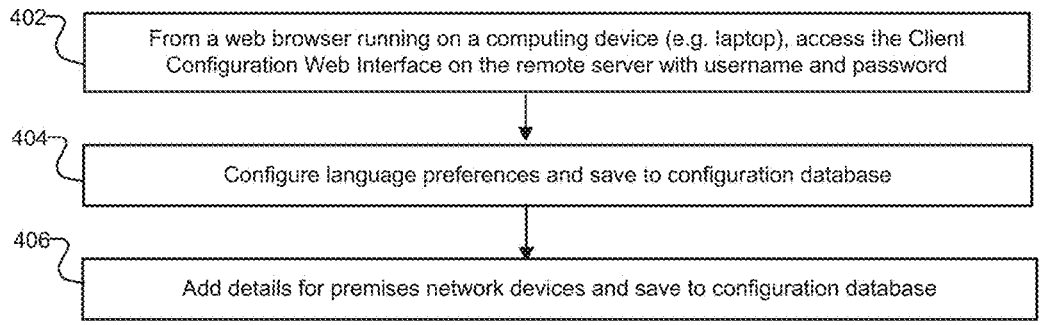
FIGS. 5A and 5B are configuration steps for the VIPA local device and a VIPA Interface of the remote server, respectively.

FIG. 5A shows a method for configuring a local device 102.

In step 402, from a web browser 106 running on a computing device 114 (e.g. laptop), users access the Client Configuration Web Interface 212 on the remote server 120 with username and password. In step 404, the user configures language preferences and saves the preferences to configuration database 206. In step 406, the user adds details for premises network devices and saves to configuration database 206.

Figure 5B:
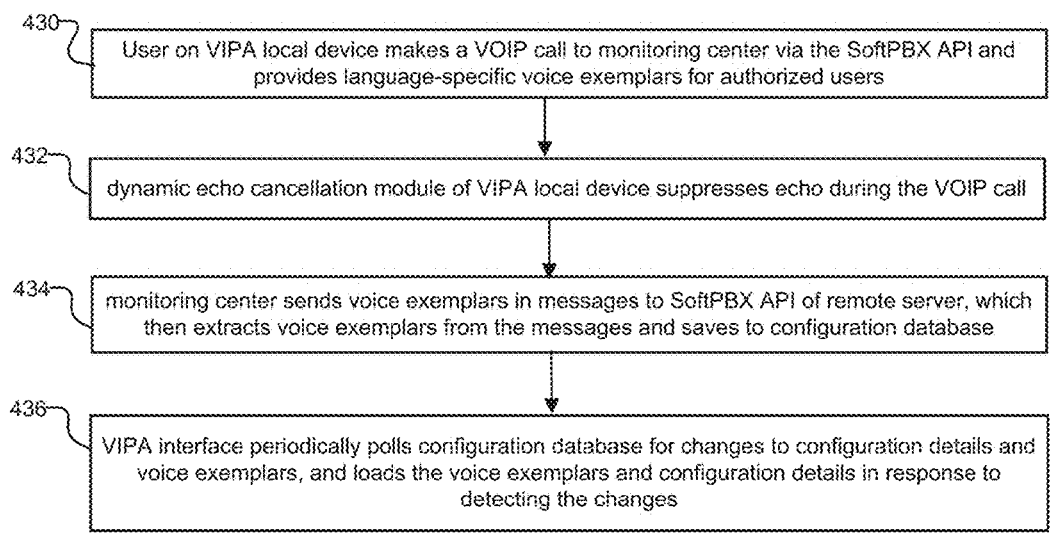

FIG. 5B shows a method for configuring a remote server 102.

In step 430, a user on VIPA local device 102 makes a VOIP call to monitoring center 60 via the SoftPBX API 209 and provides language-specific voice exemplars for authorized users. According to step 432, the dynamic echo cancellation module 276 of local device 102 suppresses echo during the VOIP call. Then, in step 434, the monitoring center 60 sends voice exemplars in messages to SoftPBX API of remote server 120, which then extracts voice exemplars from the messages and saves to configuration database 260. Finally, in step 436, the VIPA interface 210 of the remote server 20 periodically polls configuration database 206 for changes to configuration details and voice exemplars, and loads the voice exemplars and configuration details in response to detecting the changes.

Figure 6:
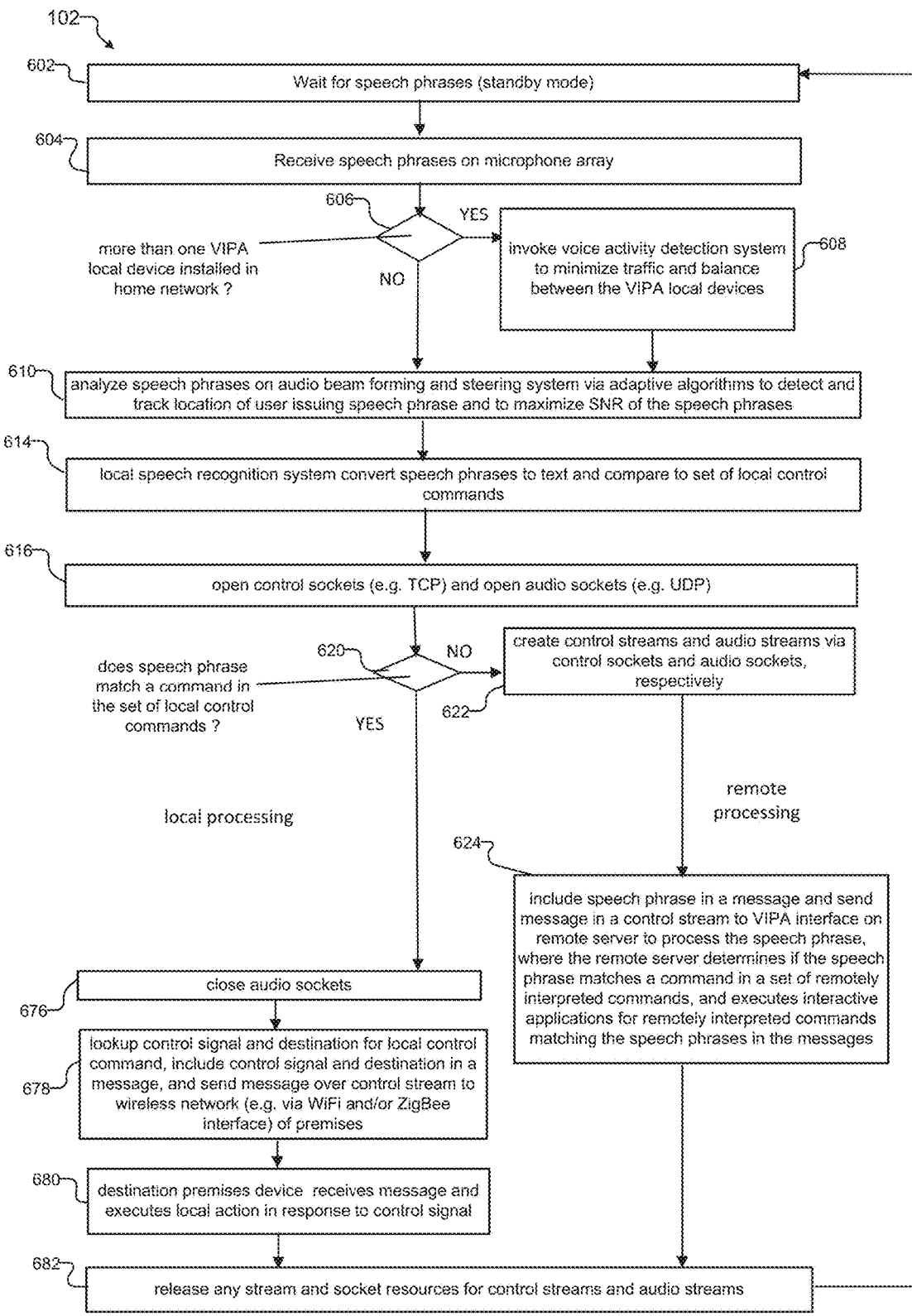
FIG. 6 is a flow chart that shows a method for processing speech phrases of users on the VIPA local device.

FIG. 6 shows a method for processing speech phrases of users on one or more VIPA local devices 102 within a premises network 130.

In step 602, the local device 102 is in standby mode 102 and awaits speech phrases from users. In step 604, local device 102 receives speech phrases on microphone array 280. If the local device 102 determines that there is more than one local device 102 installed in step 606, the method transitions to step 608. Otherwise, the method transitions to step 610.

In step 608, the local device 102 invokes the voice activity detection system 274 to minimize traffic and balance between the two VIPA local devices 102.

According to step 610, the local device 102 analyzes speech phrases on audio beam forming system and steering system 278 via adaptive algorithms to detect and track location of user issuing speech phrase and to maximize SNR of the speech phrases. In step 614, the local speech recognition system 272 converts speech phrases to text and compares the text to a set of local control commands 188. In step 616, the local device 102 opens control sockets 170 and audio sockets 172. In examples, the control sockets 170 are TCP based and the audio sockets 172 are UDP based.

In step 620, local device checks whether the speech phrase matches a command in the set of local control commands 188. If this resolves to true, the method transitions to step 676 to begin processing of the local processing capability of the local device 102. This branch is labeled in the figure as "local processing."

Otherwise, the speech phrases are prepared for processing on the remote server in step 622, where the local device 102 creates control streams 180 and audio streams 182 via control sockets 170 and audio sockets 172, respectively. This branch is labeled in the figure as "remote processing."

For the local processing branch, in step 676, the local device 102 closes the audio sockets, as they are not needed. In step 678, the local device 102 looks up control signal and destination for local control command, includes the control signal and destination in a message, and send message over control stream to wireless network (e.g. via WiFi and/or ZigBee interface) of premises network 130.

Then, in step 680, the destination premises device receives the message and executes a local action in response to the control signal. The local action can include activating or deactivating a smart TV 104 or light 108, in examples. Finally, in step 682, the local device releases any stream 180/182 and socket 170/172 resources used and transitions back to step 602 to process the next user speech phrase.

For the remote processing branch, in step 624, the local device 102 include speech phrase in a message and send message in a control stream 180 to VIPA interface 201 on remote server 120 to process the speech phrase, where the remote server 120 determines if the speech phrase matches a command in a set of remotely interpreted commands 190, and executes interactive applications 124 for remotely interpreted commands 190 matching the speech phrases in the messages.

Figure 7:
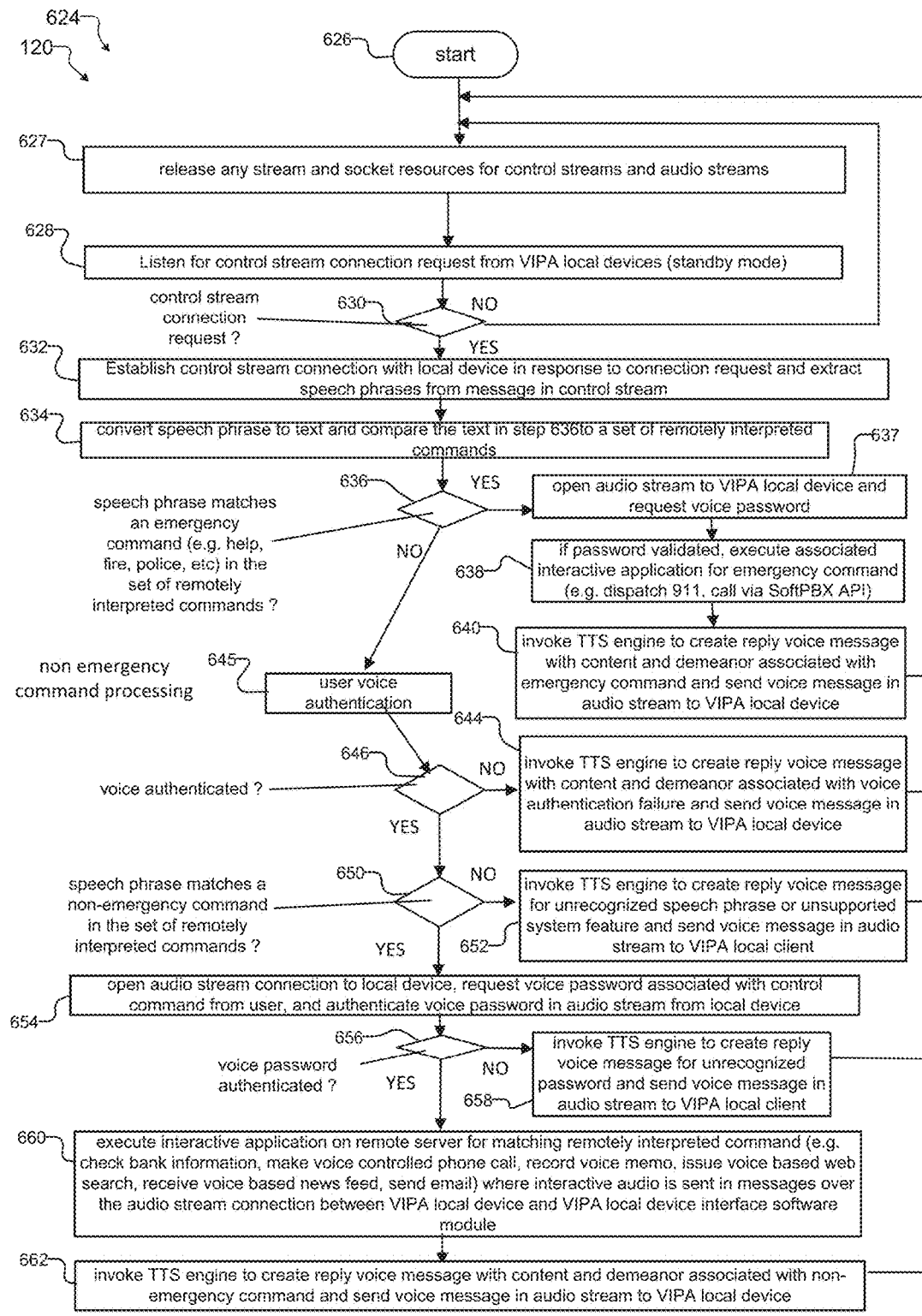
FIG. 7 is a flow chart that shows more detail for the method of FIG. 6, where the remote server matches the speech phrases to remotely interpreted commands and executes remote applications in response to the speech phrases matching the remotely interpreted commands.

FIG. 7 is a flow chart that describes a method for processing the speech phrases on the remote server 120. The method provides more detail for FIG. 6 step 624.

The method starts in step 626. In step 627, the remote server 120 first releases any stream 180/182 and socket 170/172 resources used by the remote server 120 for processing prior speech phrases. In step 628, the remote server 120 is in standby mode and listens for control stream 180 connection requests from VIPA local devices. If no control stream connection request is received in step 630 within a timeout period, the method transitions back to step 626. Otherwise, the method transitions to step 632.

In step 632, the remote server establishes a control stream connection with the local device 102 in response to the connection request, and extracts speech phrase from messages in control stream 180. According to step 634, the remote server 120 converts the speech phrase to text and compares the text to a set of remotely interpreted commands 190.

In step 636, the remote server 120 first determines if the speech phrase matches an emergency command (e.g. help, fire, police, etc) in the set of remotely interpreted commands 190. If this resolves to true, in step 637, remote server 120 begins processing the emergency command by opening an audio stream 182 with the VIPA local device 120 and requesting a voice password. In step 638, if password is validated, the remote server 120 executes associated interactive application 124 for emergency command (e.g. dispatch 911, call via SoftPBX API 209). Then in step 640, the remote server invokes the TTS engine 203 to create a reply voice message with content and demeanor associated with emergency command and sends voice message in audio stream to VIPA local device 102. Upon conclusion of step 640, the method transitions back to step 626.

When the remote server 120 determines in step 636 that the speech phrase does not matches an emergency command in the set of remotely interpreted commands 190, the method transitions to step 646. This branch is labeled in the figure as "non emergency command processing."

In step 645, the remote server 120 executes user voice authentication of the user's speech phrases. If the user's voice is not authenticated in step 646, the remote server 120 invoke TTS engine 203 to create reply voice message with content and demeanor associated with voice authentication failure and send voice message in audio stream to VIPA local device 102, and transitions back to step 626.

If the user's voice is successfully authenticated in step 646, the method transitions to step 650. In step 650, the remote server determines if the speech phrase matches a non-emergency command in the set of remotely interpreted commands 190. If the command is not recognized, in step 652, the method invoke TTS engine 203 to create reply voice message for unrecognized speech phrase or unsupported system feature and send voice message in audio stream to VIPA local client 102, and transitions back to step 626. If the command is supported, the method transitions to step 654.

In step 654, the remote server 120 opens an audio stream 182 connection to the local device, requests a voice password associated with the control command, and authenticates the voice password in the audio stream from the user on the local device 102.

If the user's voice password is not successfully authenticated in step 656, the method transitions to step 658 and invokes TTS engine 203 to create reply voice message for unrecognized password and sends voice message in audio stream to VIPA local client 102, and transitions back to step 626. If the user's voice password is successfully authenticated in step 656, the method transitions to step 660.

In step 660, the remote server 120 executes interactive applications 124 for the matching remotely interpreted command (e.g. check bank information, make voice controlled phone call, record voice memo, issue voice based web search, receive voice based news feed, send email) where interactive audio is sent in messages over the audio stream connection between VIPA local device 102 and VIPA local device interface 210 software module 200. Finally, in step 662, the method invoke TTS engine 203 to create reply voice message with content and demeanor associated with non-emergency command and send voice message in audio stream to VIPA local device 102, and transitions back to step 626.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for processing control commands in a voice interactive system, the method comprising:
   receiving speech phrases on a local device within a premises network of a home;
   detecting and tracking spatial locations of users making the speech phrases via an audio beam forming and steering system of the local device including a linear microphone array for beam forming purposes that enables the tracking of the origin of a speaker in azimuth;
   comparing the speech phrases on the local device to a set of local control commands for controlling home automation and security premises devices for the home;
   the local device controlling premises devices executing local actions for home automation and security in response to the speech phrases matching the local control commands;
   sending the speech phrases in messages to a remote server in response to the speech phrases not matching the local control commands;
   executing interactive applications on the remote server for remotely interpreting commands on the remote server matching the speech phrases in the messages;

the local device presenting an avatar on a user interface, wherein the avatar moves in response to the spatial location of the users making the speech phrases determined by the audio beam forming and steering system of the local device; and creating a reply voice message with content and demeanor associated with the interpreted command and sending the reply voice message to the local device; and rendering different expressions of the avatar in response to detected emotions sent from the remote server.

2. The method of claim 1, further comprising detecting the speech phrases on two or more local devices, installed within the home, via a voice activity detection system of the two or more local devices.

3. The method of claim 1, further comprising the local device creating control streams, and including the messages sent to the remote server within the control streams.

4. The method of claim 1, wherein the set of local control commands activates and deactivates the premises devices.

5. The method of claim 4, wherein the premises devices include security cameras, lights, televisions, motion detectors, door controllers, monitoring points, home automation hubs, and/or remote controlled power outlets.

6. The method of claim 1, wherein the interactive applications are voice controlled interactive applications.

7. The method of claim 1, wherein the interactive applications include voice interactive emergency services, voice activated phone calling, voice controlled intercom, voice controlled email, voice controlled banking transactions, voice controlled audio news feeds, voice controlled internet search, audio targeted advertising, voice controlled automation, and/or audio voice reminders.

8. The method of claim 1, wherein in response to the remotely interpreted commands on the remote server matching the speech phrases in the messages, sending voice data in audio streams between the interactive applications and the local device.

9. The method of claim 1, further comprising the remote server:
receiving tracked spatial locations of users making the speech phrases from the local device; and
interpreting the speech phrases in response to the spatial locations.

10. The method of claim 1, further comprising the remote server receiving voice data from users sent in audio streams from the local devices, detecting emotions of the users from the voice data, and in response to the detected emotions, sending voice messages associated with the detected emotions to the local devices.

11. The method of claim 1, further comprising the premises devices communicating over a wireless network of the premises network.

12. The method of claim 1, further comprising the remote server receiving voice data from users sent in audio streams from the local devices, analyzing and creating audio message information from the voice data, saving the audio message information to a current context queue in the remote server, and comparing new audio message information to the saved audio message information in the current context queue to infer context of and improve speech recognition of the voice data.

13. A method for processing control commands in a voice interactive system, the method comprising:
detecting and tracking spatial locations of users making speech phrases via an audio beam forming and steering system of a local device including a linear microphone array for beam forming purposes that enables the tracking of the origin of a speaker in azimuth, the local device installed in a home of a user;
the local device presenting an avatar on a user interface, wherein the avatar moves in response to the spatial location of the user making the speech phrases determined by the audio beam forming and steering system of the local device;
comparing the speech phrases on the local device to a set of local control commands for controlling home automation and security premises devices for the home of the user;
the local device controlling premises devices executing local actions for home automation and security in response to the speech phrases matching the local control commands;
sending the speech phrases in messages to a remote server in response to the speech phrases not matching the local control commands;
the remote server detecting emotions of the user from the voice data;
executing interactive applications on the remote server for remotely interpreting commands on the remote server matching the speech phrases in the messages;
creating a reply voice message with content and demeanor associated with the interpreted command and detected emotion and sending the reply voice message to the local device; and
the local device rendering different expressions of the avatar in response to the detected emotions sent from the remote server.

* * * * *